(12) United States Patent
Tanabe et al.

(10) Patent No.: US 12,472,801 B2
(45) Date of Patent: Nov. 18, 2025

(54) VEHICLE AIR CONDITIONING SYSTEM AND VEHICLE AIR CONDITIONING METHOD

(71) Applicant: MITSUBISHI HEAVY INDUSTRIES THERMAL SYSTEMS, LTD., Tokyo (JP)

(72) Inventors: Hirotaka Tanabe, Tokyo (JP); Takayuki Kobayashi, Tokyo (JP); Tomoki Hase, Tokyo (JP); Yasutaka Aoki, Tokyo (JP); Hideaki Tatenoi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 18/573,878

(22) PCT Filed: Aug. 3, 2022

(86) PCT No.: PCT/JP2022/029777
§ 371 (c)(1),
(2) Date: Dec. 22, 2023

(87) PCT Pub. No.: WO2023/017763
PCT Pub. Date: Feb. 16, 2023

(65) Prior Publication Data
US 2024/0294053 A1    Sep. 5, 2024

(30) Foreign Application Priority Data
Aug. 10, 2021 (JP) .................................. 2021-130458

(51) Int. Cl.
*B60H 1/14* (2006.01)
*B60H 1/32* (2006.01)

(52) U.S. Cl.
CPC ............ *B60H 1/143* (2013.01); *B60H 1/3211* (2013.01); *B60H 1/32284* (2019.05); *B60H 2001/3255* (2013.01)

(58) Field of Classification Search
CPC .. B60H 1/143; B60H 1/3211; B60H 1/32284; B60H 2001/3255
See application file for complete search history.

(56) References Cited

U.S. PATENT DOCUMENTS 11,241,930 B2   2/2022  Aikawa et al.
2015/0101789 A1* 4/2015  Enomoto ............... B60H 1/039
                                            236/35
(Continued)

FOREIGN PATENT DOCUMENTS

CN    112026474 A    12/2020
CN    112208295 A    1/2021
(Continued)

OTHER PUBLICATIONS

International Preliminary Report on Patentability and English translation of the Written Opinion of the International Searching Authority for International Application No. PCT/JP2022/029777, dated Feb. 22, 2024.

(Continued)

*Primary Examiner* — Marc E Norman
(74) *Attorney, Agent, or Firm* — BIRCH, STEWART, KOLASCH & BIRCH, LLP

(57) ABSTRACT

The vehicle air conditioning system includes: a refrigerant circuit; a heat medium circuit including high-temperature medium and low-temperature medium circuits; interior and exterior heat exchangers; an exhaust heat recovery circuit; and a switching part. The system operates in:
a mode in which the heat medium in the high-temperature medium circuit is supplied to the interior heat exchanger and exhaust heat from onboard equipment is recovered by the (Continued)

heat medium in the low-temperature medium circuit, while the heat medium recovered and transferred exhaust heat to the refrigerant is supplied to the exterior heat exchanger; and another mode in which the heat medium in the high-temperature medium circuit is supplied to the interior heat exchanger and exhaust heat from onboard equipment is recovered by the heat medium in the low-temperature medium circuit, while the heat medium recovered and transferred exhaust heat to the refrigerant is caused to bypasses the exterior heat exchanger.

14 Claims, 8 Drawing Sheets

(56) References Cited

U.S. PATENT DOCUMENTS

| | | | |
|---|---|---|---|
| 2018/0281562 A1 | 10/2018 | Spies et al. | |
| 2019/0176571 A1* | 6/2019 | Oh | B60L 58/27 |
| 2020/0346523 A1* | 11/2020 | Oh | B60H 1/00278 |
| 2020/0353796 A1* | 11/2020 | Oh | B60H 1/143 |
| 2021/0001686 A1* | 1/2021 | Kim | B60H 1/00921 |
| 2023/0415547 A1* | 12/2023 | Tanabe | B60H 1/00885 |
| 2024/0149640 A1* | 5/2024 | Tanabe | B60H 1/00899 |

FOREIGN PATENT DOCUMENTS

| | | |
|---|---|---|
| CN | 112622563 A | 4/2021 |
| JP | 11-286211 A | 10/1999 |
| JP | 2006-321389 A | 11/2006 |
| JP | 2014-117999 A | 6/2014 |
| JP | 2016-199203 A | 12/2016 |
| JP | 2021-14201 A | 2/2021 |

OTHER PUBLICATIONS

Extended European Search Report for European Application No. 22855826.8, dated Jul. 16, 2025.

* cited by examiner

VEHICLE AIR CONDITIONING SYSTEM AND VEHICLE AIR CONDITIONING METHOD

TECHNICAL FIELD

The present disclosure relates to an air conditioning system that is provided in a vehicle and that includes a circuit for a refrigerant and a circuit for a heat medium and to an air conditioning method in which such a system is used.

BACKGROUND ART

A vehicle heat management device described in PTL 1 is capable of outside air heat absorption heating operation and exhaust air heat absorption heating operation and includes a heat medium cooler, a heat medium outside air heat exchanger, and a ventilation heat recovery heat exchanger. The heat medium cooler cools a low-temperature medium through heat exchange between the low-temperature medium and a low-pressure side refrigerant of a refrigerating cycle. The heat medium outside air heat exchanger causes the low-temperature medium to absorb heat from outside air through heat exchange between the outside air and the low-temperature medium cooled by the heat medium cooler. The ventilation heat recovery heat exchanger causes the low-temperature medium to absorb heat from inside air through heat exchange between the inside air and the low-temperature medium cooled by the heat medium cooler. The ventilation heat recovery heat exchanger recovers heat that is wasted at the time of ventilation of a vehicle cabin.

The vehicle heat management device described in PTL 1 is provided with heat absorption amount adjusting means, which is a switching valve or a blower, in order to use the outside air heat absorption heating operation and the exhaust air heat absorption heating operation together in accordance with a situation instead of simply switching between the outside air heat absorption heating operation and the exhaust air heat absorption heating operation. The operation of such heat absorption amount adjusting means is controlled by controlling means such that the amount of heat absorption of the low-temperature medium in the heat medium outside air heat exchanger increases or decreases in accordance with an increase or decrease in amount of heat absorption of the low-temperature medium in the ventilation heat recovery heat exchanger.

CITATION LIST

Patent Literature

[PTL 1] Japanese Patent No. 6540180

SUMMARY OF INVENTION

Technical Problem

It is desirable to efficiently operate a vehicle air conditioning system while recovering exhaust heat from onboard equipment such as a battery instead of recovering only heat that is wasted at the time of ventilation of a vehicle cabin, for example.

An object of the present disclosure is to provide a vehicle air conditioning system and a vehicle air conditioning method with which it is possible to improve heating performance while recovering exhaust heat from onboard equipment.

Solution to Problem

In the case of a secondary loop type air conditioning system that includes a loop in which a refrigerant is caused to circulate by a refrigerating cycle and a heat medium loop in which each of a high-temperature medium and a low-temperature medium that transfer and receive heat to and from the refrigerant, it is possible to send, to the refrigerating cycle, an amount of heat recovered from heat-generating onboard equipment to the high-temperature medium or the low-temperature medium.

Here, it will be assumed that heat absorption operation in which exhaust heat from the onboard equipment is recovered to the low-temperature medium to increase the low pressure of the refrigerating cycle, the low-temperature medium after the recovery of the exhaust heat is supplied to an evaporator and an exterior heat exchanger, and the low-temperature medium is caused to absorb heat from outside air in the exterior heat exchanger is performed in a case where the temperature of the onboard equipment is lower than an in-vehicle heating target temperature. In this case, if the temperature of the low-temperature medium supplied to the exterior heat exchanger is increased to be equal to or higher than the temperature of the outside air due to an increase in amount of exhaust heat recovery to the low-temperature medium caused by, for example, an increase in temperature of the onboard equipment, an heating performance improvement effect obtained by exhaust heat recovery is reduced corresponding to the amount of heat released by the low-temperature medium to the outside air. Even in a case where the amount of wind in the exterior heat exchanger is limited to prevent such a problem, since the amount of wind changes depending on the traveling speed of a vehicle, it is difficult to prevent heat release from the low-temperature medium to the outside air by limiting the amount of wind.

The present disclosure based on the above-described knowledge of the inventor provides a vehicle air conditioning system including a refrigerant circuit in which a refrigerant circulates in accordance with a refrigerating cycle, a heat medium circuit that includes a high-temperature medium circuit in which a heat medium absorbing heat from the refrigerant of the refrigerant circuit circulates and a low-temperature medium circuit in which a heat medium releasing heat to the refrigerant of the refrigerant circuit circulates, an interior heat exchanger that causes heat exchange between the heat medium and air, an exterior heat exchanger that causes heat exchange between the heat medium and outside air, an exhaust heat recovery circuit that is configured such that heat is transferrable and receivable between onboard equipment and the heat medium, and a switch unit that is configured to switch a direction in which the heat medium flows. The air conditioning system is provided with an exhaust heat recovery heating mode, in which the heat medium of the high-temperature medium circuit is supplied to the interior heat exchanger, exhaust heat from the onboard equipment is recovered to the heat medium of the low-temperature medium circuit, and the heat medium that has recovered the exhaust heat and that has released heat to the refrigerant is supplied to the exterior heat exchanger, and an exhaust-heat-as-main-heat-source heating mode, in which the heat medium of the high-temperature medium circuit is supplied to the interior heat exchanger, the exhaust heat from the onboard equipment is recovered to the heat medium of the low-temperature medium circuit, and the heat medium that has recovered the exhaust heat and that has released heat to the refrigerant is caused to bypass the exterior heat exchanger, as operating modes of the air conditioning system.

In addition, the present disclosure provides an air conditioning method in which a vehicle air conditioning system is used, the vehicle air conditioning system including a refrigerant circuit in which a refrigerant circulates in accordance with a refrigerating cycle, a heat medium circuit that includes a high-temperature medium circuit in which a heat medium absorbing heat from the refrigerant of the refrigerant circuit circulates and a low-temperature medium circuit in which a heat medium releasing heat to the refrigerant of the refrigerant circuit circulates, an interior heat exchanger that causes heat exchange between the heat medium and air, an exterior heat exchanger that causes heat exchange between the heat medium and outside air, an exhaust heat recovery circuit that is configured such that heat is transferrable and receivable between onboard equipment and the heat medium, and a switch unit that is configured to switch a direction in which the heat medium flows.

The air conditioning method includes causing the heat medium of the low-temperature medium circuit to recover exhaust heat from the onboard equipment in a case where a first condition in which a temperature of the onboard equipment is lower than a heating target temperature set in the air conditioning system and causing the heat medium of the low-temperature medium circuit to recover the exhaust heat from the onboard equipment and causing the heat medium that has recovered the exhaust heat to bypass the exterior heat exchanger in a case where a second condition in which a temperature of the heat medium of the low-temperature medium circuit that has released heat to the refrigerant after recovering the exhaust heat from the onboard equipment is higher than a temperature of the outside air is satisfied in addition to the first condition.

Advantageous Effects of Invention

With the vehicle air conditioning system and the vehicle air conditioning method according to the present disclosure, it is possible to improve the heating performance by using the exhaust heat that is recovered from the onboard equipment to the heat medium via the exhaust heat recovery circuit.

Even if the temperature of the onboard equipment is lower than the heating target temperature, it is possible to improve the heating performance by causing the low-temperature medium to recover the exhaust heat of the onboard equipment so that a pressure on a low-pressure side in the refrigerant circuit is increased, the amount of refrigerant circulation is increased, and power consumption of a compressor is suppressed.

Here, in a case where the temperature of the low-temperature medium is lower than the temperature of the outside air, heat absorption operation from the outside air can be performed and in a case where the temperature of the low-temperature medium is higher than the temperature of the outside air due to an increase in amount of heat generated from the onboard equipment or the like, the exhaust-heat-as-main-heat-source heating mode in which the low-temperature medium is caused to bypass the exterior heat exchanger can be selected. According to the exhaust-heat-as-main-heat-source heating mode, it is possible to perform, without control or the like in which the amount of wind in the exterior heat exchanger is suppressed, heating operation while reliably preventing heat from being released from the low-temperature medium to the outside air and using the exhaust heat recovered to the low-temperature medium as a main heat source.

According to the exhaust-heat-as-main-heat-source heating mode, it is possible to improve the heating performance since it is possible to send an amount of the exhaust heat recovered from the onboard equipment to the refrigerant circuit without dumping the exhaust heat to the outside air under a condition in which the temperature of the low-temperature medium is higher than the temperature of the outside air.

DESCRIPTION OF EMBODIMENTS

Hereinafter, an embodiment will be described with reference to the accompanying drawings.

Overall Configuration

Figure 1:
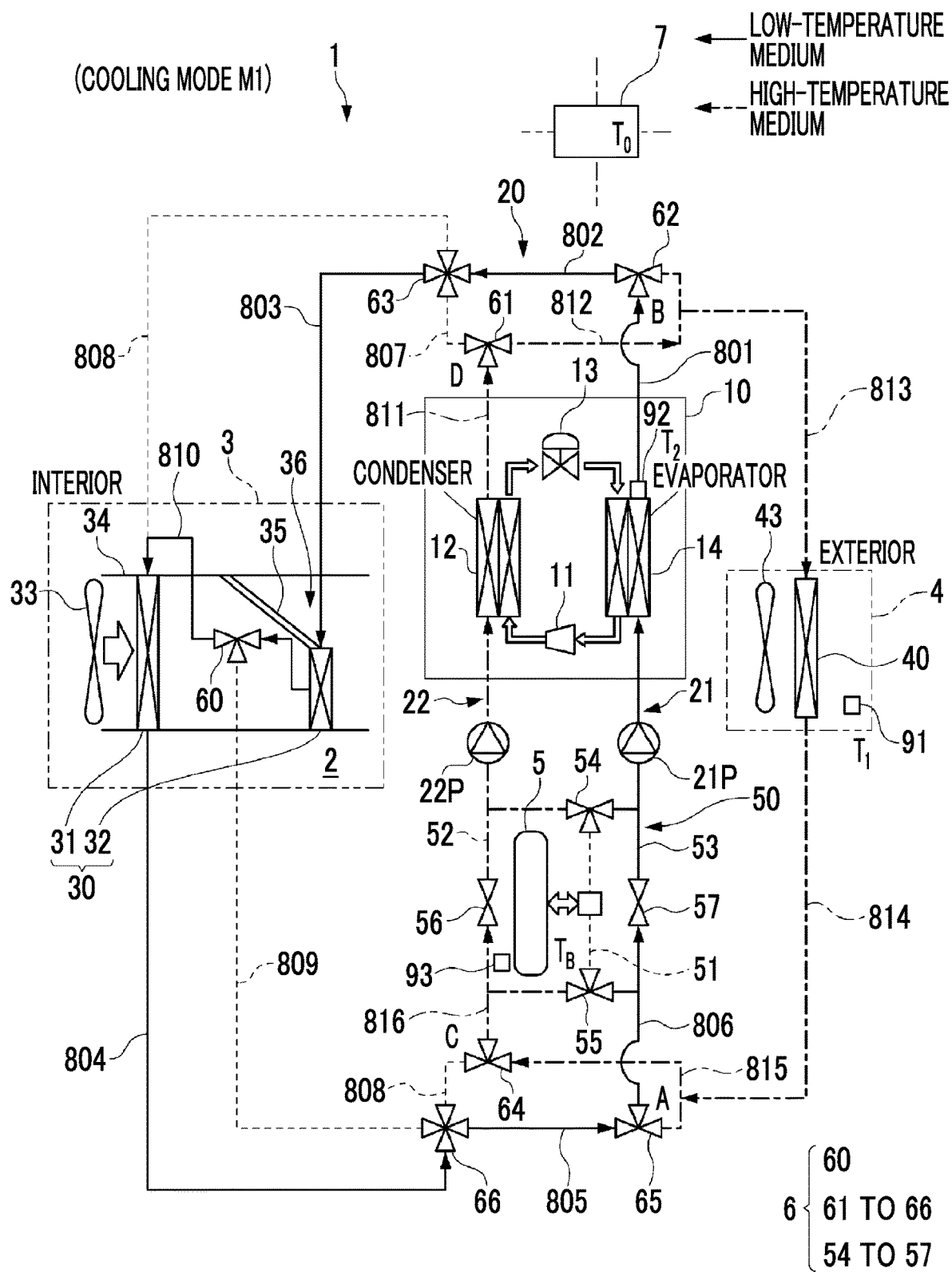
FIG. 1 is a diagram that schematically shows a vehicle air conditioning system according to an embodiment of the present disclosure and that shows an example of respective paths of a low-temperature medium and a high-temperature medium in a cooling mode.

A vehicle air conditioning system 1 shown in FIG. 1 is provided in a vehicle (not shown) such as, for example, an electric vehicle. The vehicle air conditioning system 1 takes charge of heat management of onboard equipment 5 built into a vehicle, exhaust heat recovery, or the like in addition to air conditioning such as cooling, heating, dehumidification, and ventilation of a vehicle cabin 2 in which an occupant is on board.

Note that the vehicle in which the vehicle air conditioning system 1 is provided is not limited to an electric vehicle and may be an engined vehicle.

The vehicle air conditioning system 1 includes, as main components, a refrigerant circuit 10 in which a refrigerant circulates in accordance with a refrigerating cycle, a heat medium circuit 20 in which a heat medium that transfers and receives heat with respect to the refrigerant circulates, an interior heat exchanger 30 that includes one or two or more heat exchangers 31 and 32, an exterior heat exchanger 40 that includes one or two or more heat exchangers, an exhaust heat recovery circuit 50 that is configured such that heat is transferrable and receivable between onboard equipment 5 and the heat medium, a switch unit 6 that is configured to switch a direction in which the heat medium flows in the heat medium circuit 20, and a control device 7 that sets the vehicle air conditioning system 1 to a predetermined operating mode and that controls the operation of the switch unit 6 in accordance with the operating mode.

The vehicle air conditioning system 1 has a plurality of operating modes (FIGS. 1 to 6) that are selected by an occupant or by the control device 7. FIG. 1 shows a cooling mode M1. As will be described later, in the vehicle air conditioning system 1, exhaust heat from the onboard equipment 5 can be provided for heating as at least a portion of a heat source.

Operating modes required for the vehicle air conditioning system 1 vary depending on a region where a vehicle is used. For example, the vehicle air conditioning system 1 may not have the cooling mode M1. In addition, the vehicle air conditioning system 1 may have an operating mode other than modes M1 to M6 which are shown in FIGS. 1 to 6, respectively.

Refrigerant Circuit

The refrigerant circuit 10 includes a compressor 11 that compresses the refrigerant, a condenser 12 serving as a heat exchanger for heat absorption, and an expansion valve 13 serving as a pressure reducing unit that reduces the pressure of the refrigerant passing through the compressor 11 and the condenser 12, and an evaporator 14 serving as a heat exchanger for heat release.

The compressor 11, the condenser 12, the expansion valve 13, the evaporator 14, and a refrigerant pipe connecting such elements are installed outside a vehicle cabin 2.

As the refrigerant, a known appropriate single refrigerant or refrigerant mixture can be used. For example, a hydro fluoro carbon (HFC) refrigerant such as R410A and R32, a hydro fluoro olefin (HFO) refrigerant such as R1234ze and R1234yf, a hydrocarbon (HC)-based refrigerant such as propane and isobutane, or carbon dioxide can be used as the refrigerant.

The condenser 12 causes heat exchange between a refrigerant gas discharged from the compressor 11 and a heat medium so that heat is absorbed by the heat medium from the refrigerant.

The evaporator 14 causes heat exchange between the refrigerant passing through the expansion valve 13 and a heat medium so that heat is released from the heat medium to the refrigerant. The refrigerant that has been evaporated by the evaporator 14 and of which the phase has been changed to a gas phase is sucked into the compressor 11. The refrigerant circulates in the refrigerant circuit 10 due to a difference between a refrigerant pressure in the condenser 12 and a refrigerant pressure in the evaporator 14.

Heat Medium Circuit

Through the heat medium circuit 20, a heat medium that transfers and receives heat with respect to a heat source (the condenser 12) and a cold source (the evaporator 14) formed by the refrigerant circuit 10 is transported to the interior heat exchanger 30 and the exterior heat exchanger 40. The heat medium can be used for heat management such as heating and cooling of the onboard equipment 5 or recovery of exhaust heat from the onboard equipment 5 in addition to air conditioning of the vehicle cabin 2. The onboard equipment 5 is, for example, a power source device including a driving source of an electric motor or the like, a driving circuit unit, and a battery.

The heat medium is a liquid such as water or brine that circulates in the heat medium circuit 20 while maintaining a state of being liquid. Examples of the brine include a liquid mixture of water and propylene glycol or a liquid mixture of water and ethylene glycol.

Each of a relatively high-temperature heat medium (a high-temperature medium) and a relatively low-temperature heat medium (a low-temperature medium) circulates in the heat medium circuit 20. Regardless of the operating mode, the high-temperature medium absorbs heat from the refrigerant in the condenser 12, and the low-temperature medium releases heat to the refrigerant in the evaporator 14.

In FIG. 1, a direction in which the low-temperature medium flows is represented by a solid line arrow, and a direction in which the high-temperature medium flows is represented by a one-dot chain line arrow. In the heat medium circuit 20, a path through which no heat medium flows is represented by a broken line. The same applies to FIG. 2 and subsequent drawings.

The high-temperature medium circulates in a predetermined path on the heat medium circuit 20 corresponding to the operating mode, as represented by the one-dot chain line arrow in FIG. 1, for example. The low-temperature medium circulates in a path on the heat medium circuit 20 corresponding to the operating mode, as represented by the solid line arrow in FIG. 1, for example.

The heat medium circuit 20 is divided, by the switch unit 6 switching a direction in which the heat medium flows, into a low-temperature medium circuit 21 in which the low-temperature medium circulates and a high-temperature medium circuit 22 in which the high-temperature medium circulates. FIGS. 1 to 6 show A to D on the heat medium circuit 20. Only the low-temperature medium flows from A to B. Only the high-temperature medium flows from C to D. Any one of the low-temperature medium and the high-temperature medium flows in the remaining section in the heat medium circuit 20 in accordance with the operating mode. The high-temperature medium is pumped through the high-temperature medium circuit 22 by a pump 22P disposed upstream of the condenser 12. The low-temperature medium is pumped through the low-temperature medium circuit 21 by a pump 21P disposed upstream of the evaporator 14.

It is possible to secure a heating performance for a time when the temperature of outside air is low by using both of the heat medium circuit 20 and the refrigerant circuit 10 through which the heat medium, of which the phase is not changed within an operating temperature range, are stably transported by the pumps 21P and 22P even in a case where the temperature of outside air is low to such a degree that ensuring a heating performance with the refrigerant circuit 10 alone is difficult.

In the cooling mode M1 (FIG. 1), the low-temperature medium circulates between the evaporator 14 and the interior heat exchanger 30 through a pipe of the heat medium circuit 20, and is provided for cooling in the vehicle cabin 2 which is a heat load. At this time, the high-temperature medium circulates between the condenser 12 and the exterior heat exchanger 40 through a pipe of the heat medium circuit 20.

Meanwhile, in operating modes M2 to M6 shown in FIGS. 2 to 6, the high-temperature medium circulates between the condenser 12 and the interior heat exchanger 30 and is provided for heating in the vehicle cabin 2. At this time, the low-temperature medium circulates between the evaporator 14 and the exterior heat exchanger 40 except for the operating mode M4 shown in FIG. 4.

Through the heat medium circuit 20, the high-temperature medium is supplied to at least one of the interior heat exchanger 30 and the exterior heat exchanger 40 and the low-temperature medium is supplied to at least one of the interior heat exchanger 30 and the exterior heat exchanger 40 in any operating mode.

Interior Heat Exchanger

The interior heat exchanger 30 is provided inside a console, a wall, or the like of the vehicle cabin 2, and causes heat exchange between the low-temperature medium or the high-temperature medium supplied thereto and air in the vehicle cabin 2.

The interior heat exchanger 30 constitutes a heating, ventilation, and air conditioning (HVAC) unit 3 together with a blower 33 (a blower), a duct 34 through which air sent by the blower 33 flows, a damper 35 of which the opening degree Can be adjusted, and the like.

The interior heat exchanger 30 of the present embodiment includes a first heat exchanger 31 and a second heat exchanger 32 that can be connected in series or in parallel in relation to the direction in which the heat medium flows.

An intermediate valve 60 serving as a portion of the switch unit 6 is provided between the first heat exchanger 31 and the second heat exchanger 32. It is possible to switch, between series connection (FIGS. 1 to 3) and parallel connection (FIGS. 4 to 6), the state of connection between the first heat exchanger 31 and the second heat exchanger 32 related to the direction in which the heat medium flows by opening and closing the intermediate valve 60.

In a case where the first heat exchanger 31 and the second heat exchanger 32 are connected in parallel, it is possible to supply the low-temperature medium to one of the first heat exchanger 31 and the second heat exchanger 32 and to supply the high-temperature medium to the other of the first heat exchanger 31 and the second heat exchanger 32. At this time, the intermediate valve 60 is closed.

When the first heat exchanger 31 and the second heat exchanger 32 are connected in series, the second heat exchanger 32 is positioned on an upstream side in the direction in which the heat medium flows and the first heat exchanger 31 is positioned on a downstream side in the direction in which the heat medium flows. At the time of the series connection, the heat medium flowing out of the second heat exchanger 32 flows into the first heat exchanger 31 through the intermediate valve 60 in a state of being open.

The first heat exchanger 31 and the second heat exchanger 32 are disposed in series in a direction in which air that is sent by the blower 33 flows through the duct 34. The first heat exchanger 31 is disposed on a windward side in a direction in which wind caused by the blower 33 flows and the second heat exchanger 32 is disposed on a leeward side in the direction in which the wind caused by the blower 33 flows. Therefore, in a case where the first heat exchanger 31 and the second heat exchanger 32 are connected in series in the direction in which the heat medium flows, a direction in which air flowing through the first heat exchanger 31 and the second heat exchanger 32 in order flows and a direction in which the heat medium flowing through the second heat exchanger 32 and the first heat exchanger 31 in order flows are opposite to each other. Therefore, it is possible to efficiently perform heat exchange while maintaining a sufficient temperature difference between the air and the heat medium throughout a heat exchange process performed by the first heat exchanger 31 and the second heat exchanger 32.

The damper 35 is a movable member that moves in the duct 34 by being driven by a drive unit (not shown). The drive unit (not shown) drives the damper 35 based on a control command issued from the control device 7.

Figure 2:
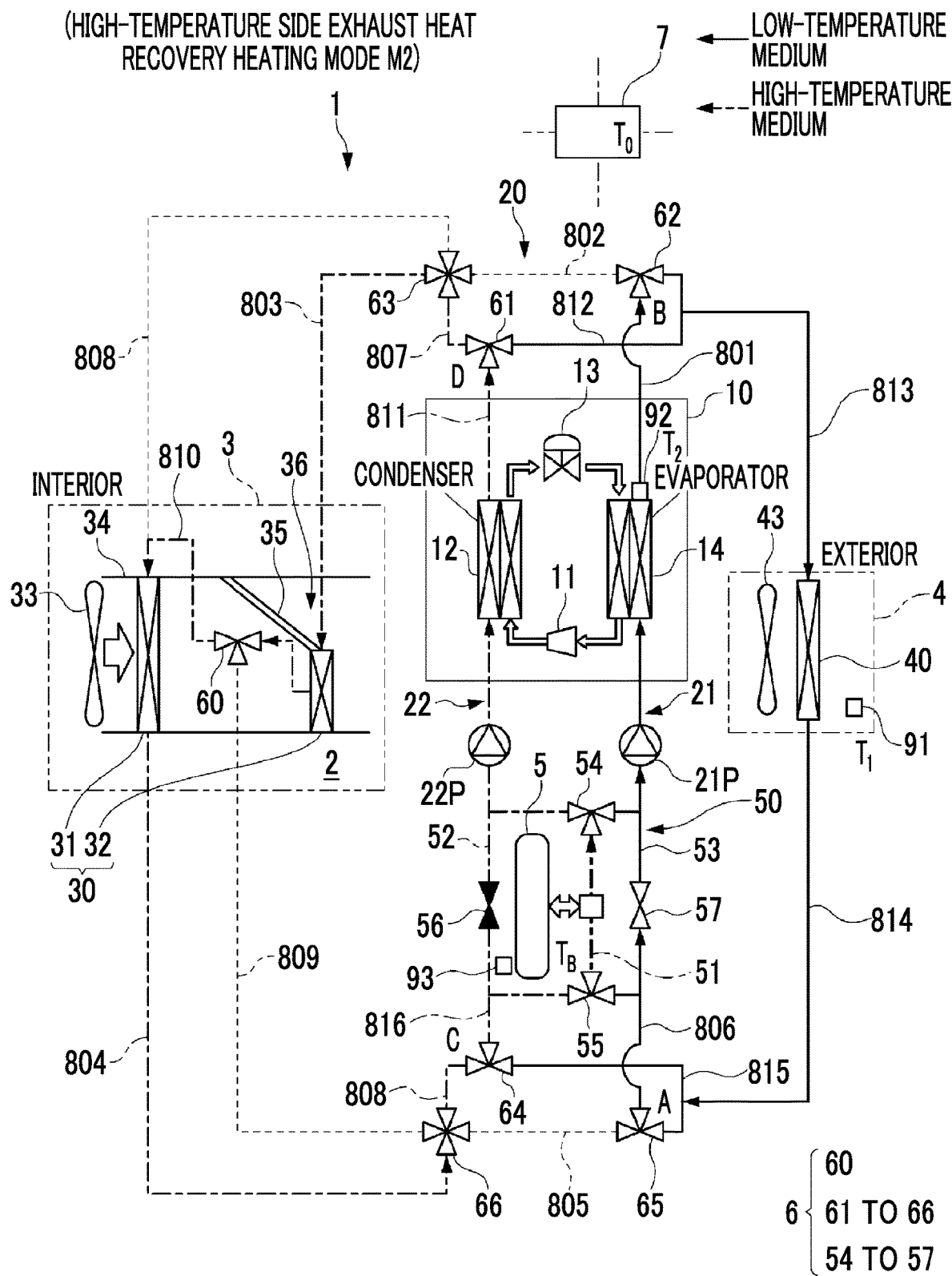
FIG. 2 is a diagram that shows an example of respective paths for the low-temperature medium and the high-temperature medium in a high-temperature side exhaust heat recovery heating mode.
Figure 3:
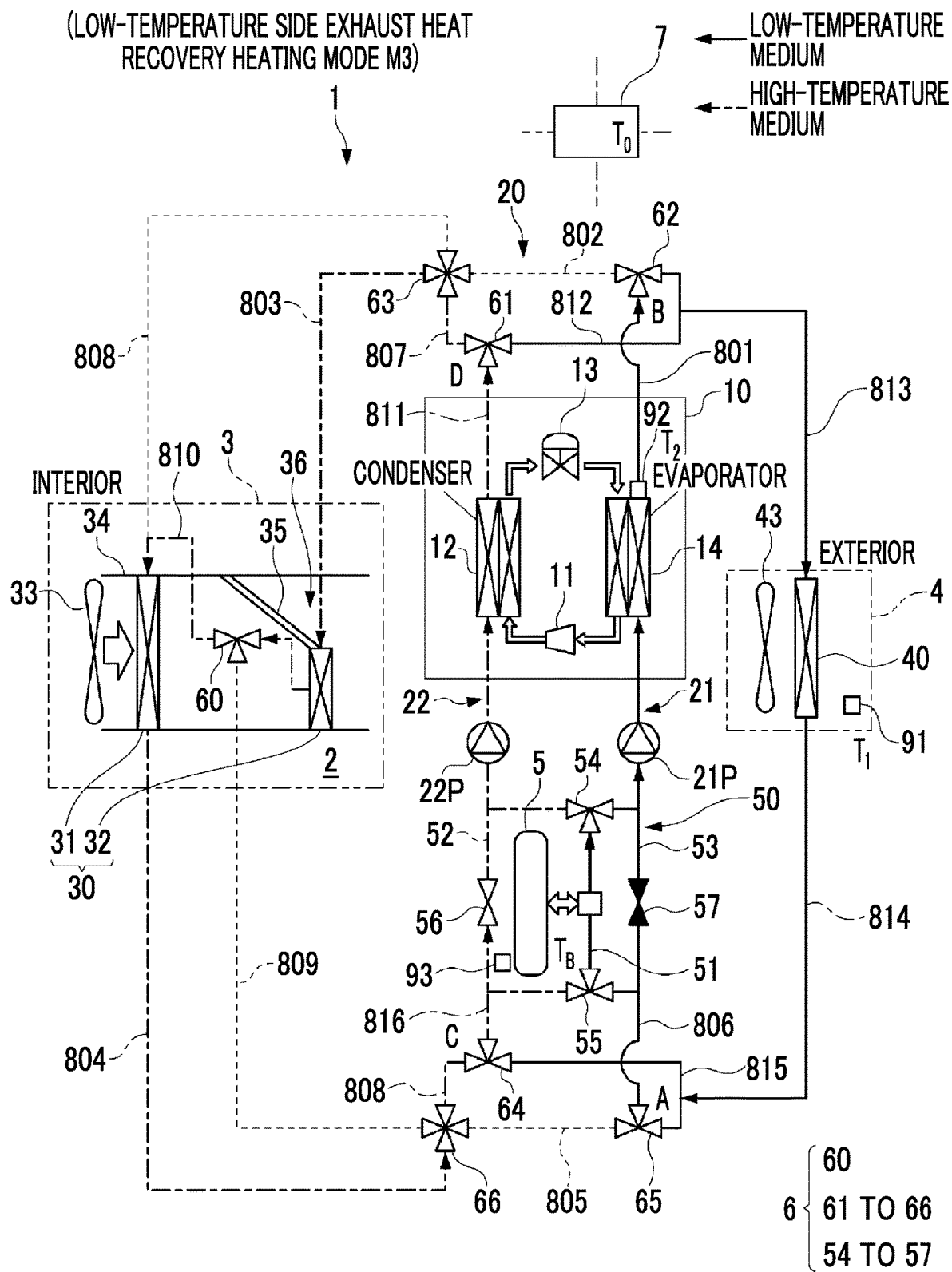
FIG. 3 is a diagram that shows an example of respective paths for the low-temperature medium and the high-temperature medium in a low-temperature side exhaust heat recovery heating mode.
Figure 4:
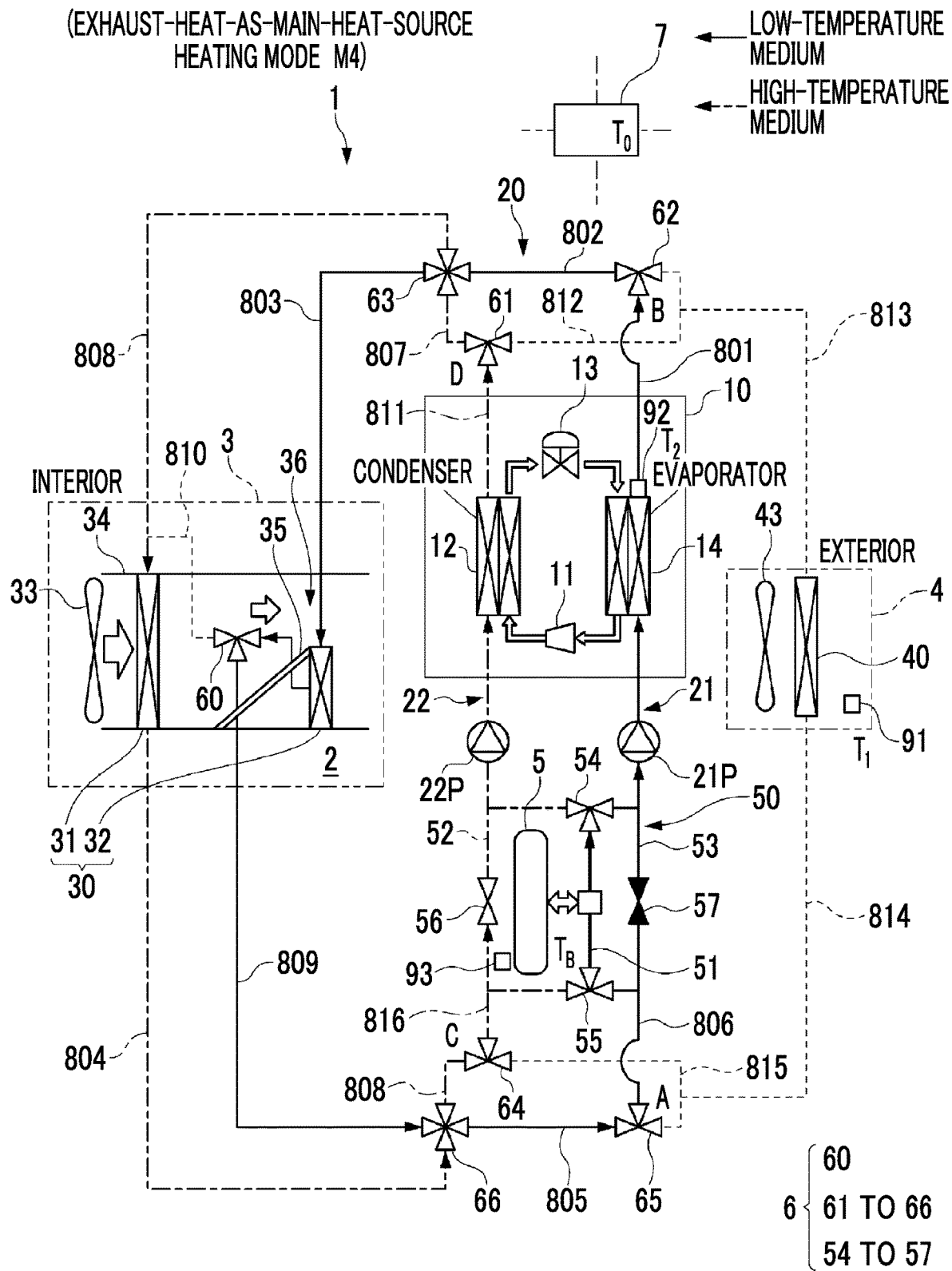
FIG. 4 is a diagram that shows an example of respective paths for the low-temperature medium and the high-temperature medium in an exhaust-heat-as-main-heat-source heating mode.
Figure 5:
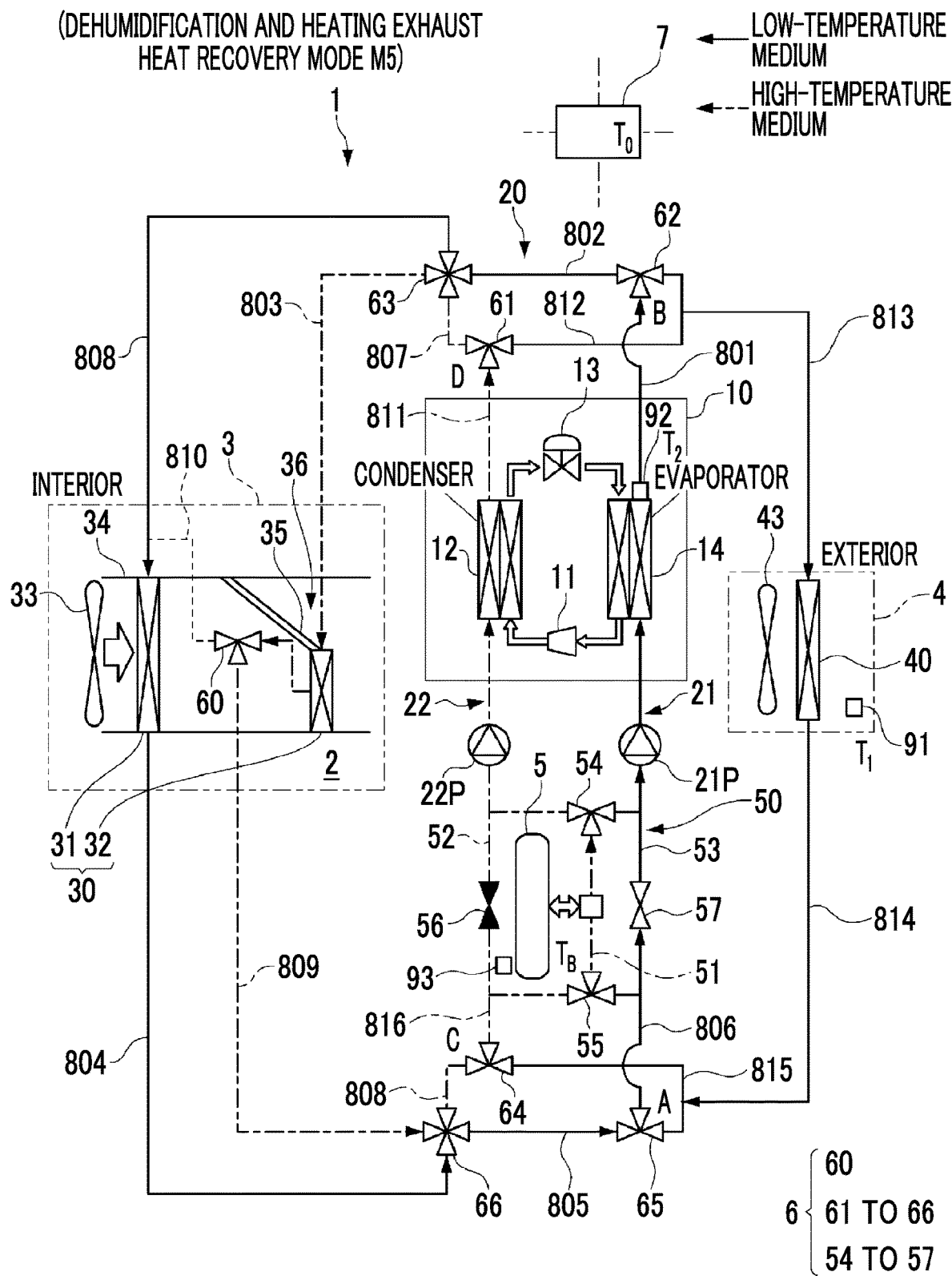
FIG. 5 is a diagram that shows an example of respective paths for the low-temperature medium and the high-temperature medium in a dehumidification and heating exhaust heat recovery mode.
Figure 6:
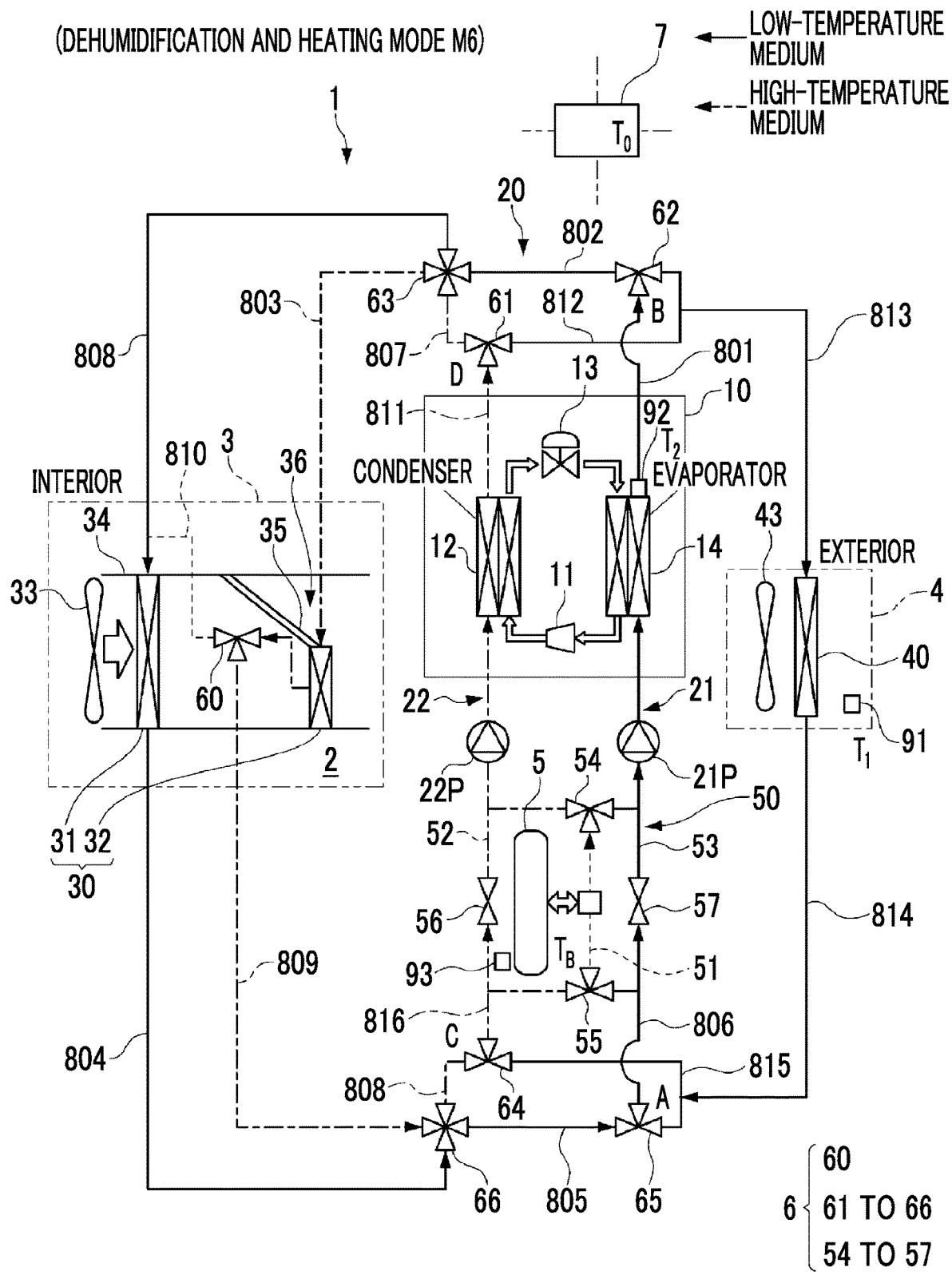
FIG. 6 is a diagram that shows an example of respective paths for the low-temperature medium and the high-temperature medium in a dehumidification and heating mode.

With the damper 35 being operated, an arbitrary opening degree Can be set within a range from a fully open state shown in FIGS. 1 to 3 to a fully closed state shown in FIG. 4. Air passing through the first heat exchanger 31 flows into the second heat exchanger 32 at a ratio corresponding to the opening degree of the damper 35.

For example, when a flow path 36 between the second heat exchanger 32 and an inner wall of the duct 34 is blocked by the damper 35 as shown in FIG. 1, the entire volume of air passing through the first heat exchanger 31 flows into the second heat exchanger 32. Meanwhile, when the damper 35 is tilted to the second heat exchanger 32 side so that air is restrained from flowing into the second heat exchanger 32 by the damper 35 as shown in FIG. 4, the entire volume of air passing through the first heat exchanger 31 passes through the flow path 36.

It is possible to adjust the temperature of air blown out from the HVAC unit 3 to a target temperature of the vehicle cabin 2 by adjusting the opening degree of the damper 35 to change a ratio of the flow rate of air introduced into the second heat exchanger 32 to the flow rate of the entire volume of air passing through the first heat exchanger 31.

Exterior Heat Exchanger

The exterior heat exchanger 40 causes heat exchange between air (outside air) taken in from the outside of the vehicle cabin 2 and the low-temperature medium or the high-temperature medium. The exterior heat exchanger 40 corresponds to, for example, a radiator disposed in the vicinity of an air introduction inlet of the vehicle. An exterior heat exchanger unit 4 is composed of the exterior heat exchanger 40 and a blower 43.

Outside air is supplied to the exterior heat exchanger 40 and is discharged to the outside of the vehicle as the vehicle travels and the blower 43 is operated.

The exterior heat exchanger 40 may be composed of two heat exchangers, similarly to the interior heat exchanger 30. In this case, for example, the two heat exchangers can be arranged in series in relation to a flow caused by the blower 43 and the two heat exchangers can be connected to each other in the direction in which the heat medium flows such that switching between series connection and parallel connection can be made. A valve similar to the intermediate valve 60 is provided between the two heat exchangers connected in series in the direction in which the heat medium flows.

In the cooling mode M1 shown in FIG. 1, the exterior heat exchanger 40 causes the high-temperature medium, of which the temperature is higher than the temperature of outside air, to release heat to the outside air and in heating modes shown in FIG. 2, FIG. 3, FIG. 5, and FIG. 6, the exterior heat exchanger 40 causes the low-temperature medium, of which the temperature is lower than the temperature of the outside air, to absorb heat from the outside air.

The heating mode shown in FIG. 4 is prepared on the assumption that the temperature of the low-temperature medium is higher than the temperature of the outside air due to recovery of exhaust heat from the onboard equipment 5 to the low-temperature medium. In such a heating mode (exhaust-heat-as-main-heat-source heating mode M4), the low-temperature medium is caused to bypass the exterior heat exchanger 40 as will be described later so that heat is not released from the low-temperature medium to the outside air. Note that the exhaust-heat-as-main-heat-source heating mode M4 is a mode in which the temperature of the inside of the vehicle cabin 2 can be more quickly increased to a predetermined temperature from a state where the temperature of the inside of the vehicle cabin 2 has been decreased to a temperature equal to the temperature of the outside air than in a normal heating operating mode (a high-temperature side exhaust heat recovery heating mode M2 in which the low-temperature medium is supplied to the exterior heat exchanger 40 and the high-temperature medium is supplied to the interior heat exchanger 30 and the onboard equipment 5).

Exhaust Heat Recovery Circuit

The exhaust heat recovery circuit 50 is provided upstream of the condenser 12 and upstream of the evaporator 14 in the direction in which the heat medium flows and is configured such that heat from the onboard equipment 5, which is a battery or the like, can be absorbed by the heat medium and transferred to the refrigerant circuit 10. Exhaust heat recovered from the onboard equipment 5 to the heat medium is provided for heating in the vehicle cabin 2, which is a heat load, as at least a portion of a heat source at the time of heating of an electric vehicle in which a heat source is likely to be insufficient.

In addition, since the onboard equipment 5 stably operates in a predetermined temperature range, the exhaust heat recovery circuit 50 is used to adjust the temperature of the onboard equipment 5 to an appropriate temperature.

The exhaust heat recovery circuit 50 includes a heat exchange path 51 in which one of the high-temperature medium and the low-temperature medium is thermally coupled to the onboard equipment 5 which is a battery or the like, a high-temperature side bypass 52 through which the high-temperature medium bypasses the onboard equipment 5, and a low-temperature side bypass 53 through which the low-temperature medium bypasses the onboard equipment 5.

The exhaust heat recovery circuit 50 is provided with valves 54 to 57 that are used to switch whether or not to cause heat exchange between the onboard equipment 5 and the heat medium and that are used to adjust the amount of the heat exchange. The valves 54 to 57 correspond to a portion of the switch unit 6.

One of the high-temperature medium and the low-temperature medium flowing through the heat exchange path 51 and the onboard equipment 5 transfer and receive heat in accordance with the temperature of exhaust heat from the onboard equipment 5, the target temperature of the vehicle cabin 2, the temperature of the outside air, or the like.

The onboard equipment 5 and the heat medium do not transfer and receive heat when neither the high-temperature medium nor the low-temperature medium flows through the heat exchange path 51 and the high-temperature medium and the low-temperature medium flow through the bypasses 52 and 53, respectively. For example, in the cooling mode M1 shown in FIG. 1, both the high-temperature medium and the low-temperature medium bypass the onboard equipment 5 through the respective bypasses 52 and 53 and thus heat is not transferred and received between the onboard equipment 5 and the heat medium circuit 20.

However, the present invention is not limited to such an example, and in the cooling mode, the valves 54 to 57 can be operated such that the onboard equipment 5 is cooled by the low-temperature medium flowing through the heat exchange path 51.

At the time of heating of the vehicle cabin 2, the exhaust heat recovery circuit 50 can cause any of the high-temperature medium and the low-temperature medium to absorb exhaust heat of the onboard equipment 5 based on a relationship between the temperature of the onboard equipment 5 that is detected by an onboard equipment temperature sensor 93 and a heating target temperature set by an occupant or the control device 7.

For example, in a case where the temperature of the onboard equipment 5 is higher than the heating target temperature, the high-temperature medium is supplied to the heat exchange path 51 so that the exhaust heat from the onboard equipment 5 is absorbed by the high-temperature medium and is provided for heating. This corresponds to the high-temperature side exhaust heat recovery heating mode 2 shown in FIG. 2 and a dehumidification and heating exhaust heat recovery mode M5 shown in FIG. 5. At this time, for example, the valve 56 provided in the high-temperature side bypass 52 is closed and the high-temperature medium flows through the heat exchange path 51 only. Note that, in FIG. 2 to FIG. 5, the valve 56 or the valve 57 in a closed state is shown by being completely colored in black.

In a case where the temperature of the onboard equipment 5 is lower than the heating target temperature, the low-temperature medium is supplied to the heat exchange path 51 so that the exhaust heat from the onboard equipment 5 is absorbed by the low-temperature medium and is provided for heating. This corresponds to a low-temperature side exhaust heat recovery heating mode M3 shown in FIG. 3 and the exhaust-heat-as-main-heat-source heating mode M4 shown in FIG. 4.

For adjustment of the amount of exhaust heat recovery and for prevention of an excessive change in temperature or a sudden change in temperature of the onboard equipment 5 that is caused by heat exchange between the heat medium and the onboard equipment 5, it is preferable that the high-temperature medium and the low-temperature medium are distributable to the heat exchange path 51 and the bypasses 52 and 53 by operating the valves 54 to 57.

For example, it is possible to distribute the high-temperature medium to the heat exchange path 51 and the high-temperature side bypass 52 by opening the valve 56 in the high-temperature side exhaust heat recovery heating mode M2 shown in FIG. 2. It is also possible to distribute the low-temperature medium to the heat exchange path 51 and the low-temperature side bypass 53 by opening the valve 57 in another mode.

For a gradual change in temperature of the onboard equipment 5, after a predetermined time elapses in a state where the high-temperature medium has been distributed to the heat exchange path 51 and the high-temperature side bypass 52, the valve 56 may be closed so that the high-temperature medium to flow through only the heat exchange path 51.

In a case where the temperature of the onboard equipment 5 is lower than the temperature of the low-temperature medium due to the influence of the temperature of the outside air or the like, the exhaust heat from the onboard equipment 5 cannot be recovered to the heat medium. In such a case, it is possible to heat the onboard equipment 5 by supplying the low-temperature medium or the high-temperature medium to the heat exchange path 51.

Switch Unit

The switch unit 6 includes downstream valves 61 to 63 that are positioned downstream of the condenser 12 and the evaporator 14, upstream valves 64 to 66 that are positioned upstream of the condenser 12 and the evaporator 14, the intermediate valve 60 that is used to switch between parallel connection and series connection of the first heat exchanger 31 and the second heat exchanger 32, and the above-described valves 54 to 57 that are used to switch whether or not to recover the exhaust heat from the onboard equipment 5 and that are used to adjust the amount of exhaust heat recovery.

The downstream valves 61 to 63 and the upstream valves 64 to 66 are configured such that a path that includes at least one of the interior heat exchanger 30 and the exterior heat exchanger 40 can be set for each of the low-temperature medium and the high-temperature medium.

The valves 60 to 66 and 54 to 57 are all electromagnetic valves, and are opened and closed by a control command issued from the control device 7.

The intermediate valve 60, the downstream valve 61, and the downstream valve 62 are three-way valves, and the downstream valve 63 is a four-way valve. The upstream valve 64 and the upstream valve 65 are three-way valves, and the upstream valve 66 is a four-way valve. In addition, the valves 54 and 55 of the exhaust heat recovery circuit 50 are three-way valves, and the valves 56 and 57 are two-way valves.

A port of each valve is selectively opened and closed in accordance with the operating mode, and the heat medium flows through the heat medium circuit 20 in accordance with flow paths set in the valves.

The downstream valves 61 to 63 are positioned downstream of the condenser 12 and the evaporator 14 in the heat medium circuit 20. The upstream valves 64 to 66 are positioned upstream of the condenser 12 and the evaporator 14 in the heat medium circuit 20.

With reference to the cooling mode M1 shown in FIG. 1, the operation of the switch unit 6 and an example of paths, through which the low-temperature medium and the high-temperature medium respectively flow in the heat medium circuit 20, will be described.

The low-temperature medium (represented by a solid line) that has released heat to the refrigerant in the evaporator 14 flows out from the evaporator 14 to a pipe 801 positioned downstream of the evaporator 14, flows through a pipe 802 and a pipe 803 in order in accordance with the open/closed state of each port of the downstream valve 62 and the downstream valve 63, and is supplied to the interior heat exchanger 30. The low-temperature medium that has flowed through the second heat exchanger 32 and the first heat exchanger 31 in order and that has flown out to a pipe 804 flows through pipes 805 and 806 and the low-temperature side bypass 53 in order and returns to the evaporator 14 in accordance with the open/closed states of the upstream valves 66 and 65 and the valve 57.

Meanwhile, the high-temperature medium (represented by a one-dot chain line) that absorbs heat from the refrigerant in the condenser 12 flows out from the condenser 12 to a pipe 811 positioned downstream of the condenser 12, flows through the downstream valve 61, a pipe 812, and a pipe 813 in order, and is supplied to the exterior heat exchanger 40 so that heat is released to the outside air. The high-temperature medium that has flown out from the exterior heat exchanger 40 to a pipe 814 flows through pipes 815 and 816 and the high-temperature side bypass 52 in order and returns to the condenser 12 in accordance with the open/closed states of the upstream valves 65 and 64 and the valve 56.

The number of valves constituting the switch unit 6 in the present embodiment, the arrangement thereof, and the way in which a path is set for each of the low-temperature medium and the high-temperature medium in each operating mode corresponding thereto are merely an example. A switch unit having an appropriate configuration can be adopted for realization of directions in which the low-temperature medium and the high-temperature medium flow in each operating mode provided in the vehicle air conditioning system 1.

Control Device

The control device 7 is configured to set the vehicle air conditioning system 1 to a predetermined operating mode and to control the operation of the switch unit 6 in accordance with the operating mode.

The vehicle air conditioning system 1 of the present embodiment is provided with five heating modes M2 to M6 in addition to the cooling mode M1 and in the modes M2 to M5 excluding the mode M6, the exhaust heat from the onboard equipment 5 is used as at least a portion of a heat source.

Figure 7:
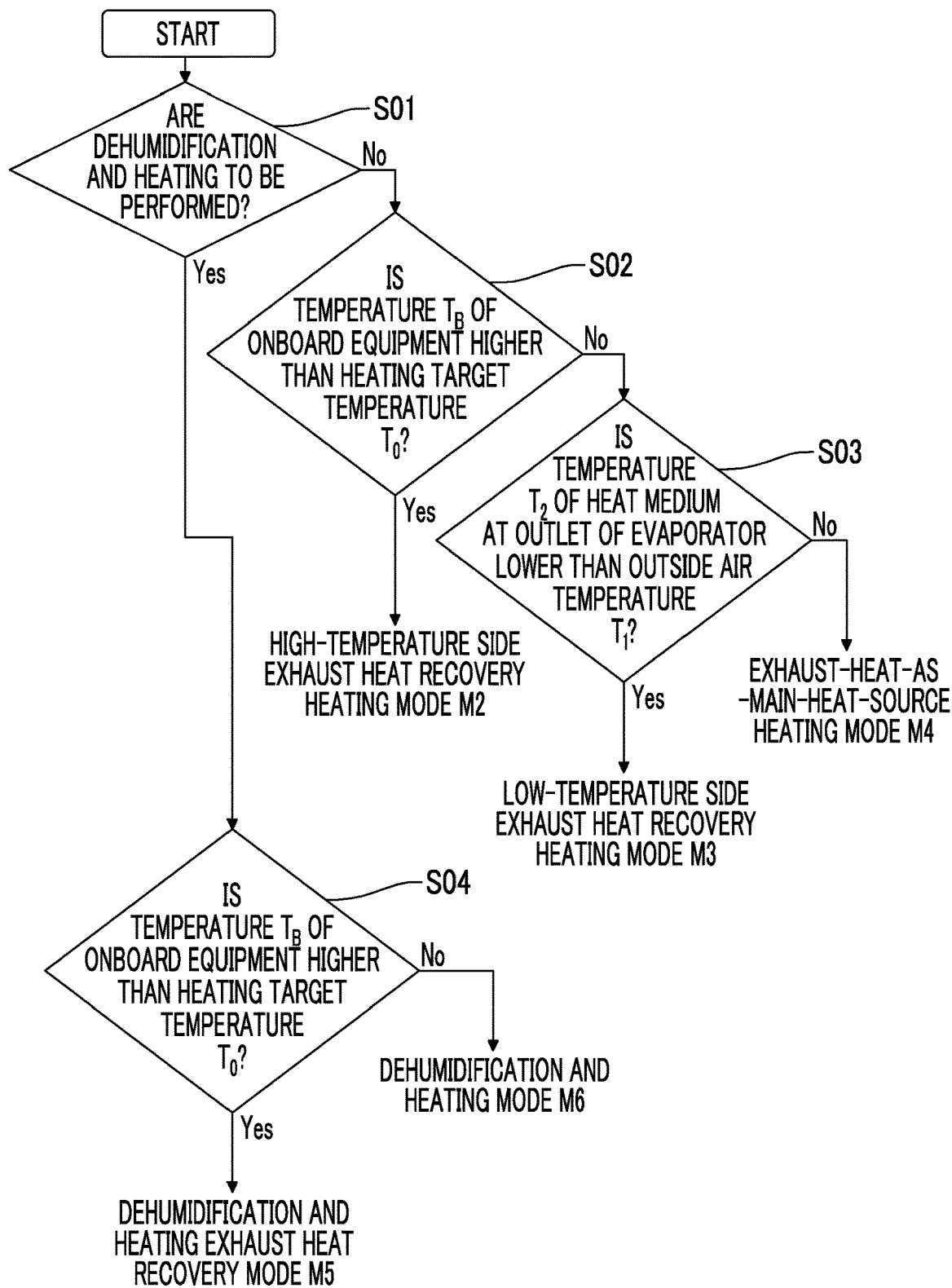
FIG. 7 is a flowchart for description of mode selection related to heating.

In relation to the heating modes including dehumidification and heating, the control device 7 sets the vehicle air conditioning system 1 to a predetermined operating mode based on temperature conditions which are the temperature of the onboard equipment 5, the heating target temperature, and the temperature of the outside air as shown in FIG. 7.

For the control device 7 to set an operating mode, an outside air temperature sensor 91 that detects the temperature of the outside air that exchanges heat with the heat medium in the exterior heat exchanger 40, a heat medium temperature sensor 92 that detects the temperature of the heat medium at an outlet through which the heat medium flows out from the evaporator 14, and the onboard equipment temperature sensor 93 that detects the temperature of the onboard equipment 5 are used.

Note that the heat medium temperature sensor 92 does not need to be installed at the outlet through which the heat medium flows out from the evaporator 14 and may be installed at an inlet through which the heat medium flows into the exterior heat exchanger 40. Alternatively, the heat medium temperature sensor 92 may be installed between a heat medium outlet of the evaporator 14 and a heat medium inlet of the exterior heat exchanger 40.

Description about Each Heating Mode

An example of mode selection performed by the control device 7 will be described with reference to FIG. 7.

At the time normal heating in which of dehumidification is not performed (No in step S01), the control device 7 sets the vehicle air conditioning system 1 to an operating mode selected among the high-temperature side exhaust heat recovery heating mode M2, the low-temperature side exhaust heat recovery heating mode M3, and the exhaust-heat-as-main-heat-source heating mode M4 based on temperature conditions (step S02 and step S03).

Specifically, in a case where a temperature $T_B$ detected by the onboard equipment temperature sensor 93 is higher than a heating target temperature $T_0$ (Yes in step S02), the high-temperature side exhaust heat recovery heating mode M2 in which heat absorption operation from the outside air to the low-temperature medium is performed while exhaust heat is being recovered to the high-temperature medium is selected. As the high-temperature side exhaust heat recovery heating mode M2 is selected, the control device 7 controls the operation of the switch unit 6 such that a path shown in FIG. 2 is set for each of the low-temperature medium and the high-temperature medium.

In the high-temperature side exhaust heat recovery heating mode M2 (FIG. 2), the exhaust heat from the onboard equipment 5 is absorbed by the high-temperature medium in the exhaust heat recovery circuit 50 while heat absorption operation, in which the low-temperature medium is caused to absorb heat from the outside air and the high-temperature medium is transported to a heat load, is being performed. Therefore, the high-temperature medium that has absorbed heat from the onboard equipment 5 by flowing through the heat exchange path 51 and that has absorbed heat from the refrigerant in the condenser 12 is supplied to the interior heat exchanger 30 and the low-temperature medium that has released heat to the refrigerant in the evaporator 14 is supplied to the exterior heat exchanger 40.

Due to control at the time of heating operation, the temperature of the high-temperature medium is kept close to the heating target temperature $T_0$. In a case where the temperature $T_B$ of the onboard equipment 5 is higher than the heating target temperature $T_0$ (Yes in step S02 described above), the temperature $T_B$ of the onboard equipment 5 is higher than the temperature of the high-temperature heat medium. Therefore, the high-temperature medium absorbs heat from the onboard equipment 5 over a period for which the high-temperature side exhaust heat recovery heating mode M2 is selected.

In a case where the temperature $T_B$ of the onboard equipment 5 is lower than the heating target temperature To (No in step S02), the control device 7 determines whether or not a temperature $T_2$ of the low-temperature medium at the outlet of the evaporator 14 is lower than an outside air temperature $T_1$ detected by the outside air temperature sensor 91.

In a case where it is determined that the temperature $T_2$ of the low-temperature medium at the outlet of the evaporator 14 is lower than the outside air temperature $T_1$ as a result of such determination (Yes in step S03), the low-temperature side exhaust heat recovery heating mode M3 is selected.

In the low-temperature side exhaust heat recovery heating mode M3 (FIG. 3), unlike the high-temperature side exhaust heat recovery heating mode M2, the exhaust heat from the onboard equipment 5 is recovered to the low-temperature medium while heat absorption operation similar to the high-temperature side exhaust heat recovery heating mode M2 is being performed.

Meanwhile, in a case where the temperature $T_2$ of the low-temperature medium at the outlet of the evaporator 14 is higher than the outside air temperature $T_1$ (No in Step S03), the exhaust-heat-as-main-heat-source heating mode M4 is selected.

In other words, the exhaust-heat-as-main-heat-source heating mode M4 is selected by the control device 7 in a case where both a first condition and a second condition described below are satisfied.

First condition: The temperature $T_B$ of the onboard equipment 5 is lower than the set heating target temperature $T_0$.

Second condition: The temperature $T_2$ of the low-temperature medium at the outlet of the evaporator 14 is higher than the outside air temperature $T_1$.

Here, as a specific method of determining whether or not each of the first condition and the second condition is satisfied, it is possible to perform the determination by using one or more threshold values so that an appropriate mode is selected.

For example, it will be assumed that a threshold value t1-1 that corresponds to the heating target temperature $T_0$ or that is lower than the heating target temperature $T_0$ and a threshold value t1-2 that is higher than both the heating target temperature $T_0$ and the threshold value t1-1 are set for the first condition. Then, it is possible to determine whether or not the first condition is satisfied by using the control device 7 determining that the first condition is satisfied in a case where the temperature $T_B$ of the onboard equipment 5 is relatively lowered with respect to the heating target temperature $T_0$ and is equal to or lower than the threshold value t1-1 and determining that the first condition is not satisfied in a case where the temperature $T_B$ is increased to be equal to or higher than the threshold value t1-2. In this case, the first condition is regarded as being satisfied over a period during which the temperature $T_B$ of the onboard equipment 5 is a temperature between the threshold value t1-1 and the threshold value t1-2.

As with the above description, it will be assumed that a threshold value t2-1 that corresponds to the outside air temperature $T_1$ or that is higher than the outside air temperature $T_1$ and a threshold value t2-2 that is lower than both the outside air temperature $T_1$ and the threshold value t2-1 are set for the second condition. Then, it is possible to determine whether or not the second condition is satisfied by using the control device 7 determining that the second condition is satisfied in a case where the temperature $T_2$ of the low-temperature medium is relatively increased with respect to the outside air temperature $T_1$ and is equal to or higher than the threshold value t2-1 and determining that the second condition is not satisfied in a case where the temperature $T_2$ is lowered to be equal to or lower than the threshold value t2-2. In this case, the second condition is regarded as being satisfied over a period during which the temperature $T_2$ of the low-temperature medium is a temperature between the threshold value t2-1 and the threshold value t2-2.

For example, in a case where the first condition and the second condition are satisfied due to an increase in amount of heat generated from the onboard equipment 5 or a decrease in outside air temperature $T_1$, the operating mode is switched from the low-temperature side exhaust heat recovery heating mode M3 to the exhaust-heat-as-main-heat-source heating mode M4. At this time, even when heat is released from the low-temperature medium that has absorbed heat from the onboard equipment 5 to the refrigerant by the evaporator 14, the temperature $T_2$ of the low-temperature medium is higher than the outside air temperature $T_1$. When $T_1 > T_2$ as in the low-temperature side exhaust heat recovery heating mode M3, heat can be absorbed by the low-temperature medium from the outside air with a heat exchange efficiency corresponding to a temperature difference between $T_1$ and $T_2$. In a case where such a temperature difference is reversed such that $T_1<T_2$, heat is released from the low-temperature medium to the outside air. In a case where heat is released to the outside air, a portion of an amount of exhaust heat recovered from the onboard equipment 5 cannot be delivered to the refrigerating cycle of the refrigerant circuit 10 and is dumped to the outside of the refrigerating cycle. That is, the exhaust heat from the onboard equipment 5 is not sufficiently utilized.

In the exhaust-heat-as-main-heat-source heating mode M4 (FIG. 4), the exhaust heat is recovered to the low-temperature medium as with the low-temperature side exhaust heat recovery heating mode M3. However, for prevention of release of heat from the low-temperature medium to the outside air, the low-temperature medium is caused to circulate in the low-temperature medium circuit 21 in a state of bypassing the exterior heat exchanger 40. In the mode M4, no heat absorption operation from the outside air is performed and heating operation is performed while using the exhaust heat from the onboard equipment 5 as a main heat source.

In the exhaust-heat-as-main-heat-source heating mode M4, the blower 43 may be stopped since no heat medium flows through the exterior heat exchanger 40.

For prevention of release of heat from the low-temperature medium to the outside air, the low-temperature medium may be caused to bypass the exterior heat exchanger 40 and a flow rate distribution ratio between the heat exchange path 51 and the low-temperature side bypass 53 may be adjusted by the valve 57 so that the amount of the exhaust heat recovered from the onboard equipment 5 to the low-temperature medium is reduced.

In the present embodiment, a path for the low-temperature medium caused to bypass the exterior heat exchanger 40 is set in the second heat exchanger 32 of the interior heat exchanger 30. Since the interior heat exchanger 30 is composed of the plurality of heat exchangers 31 and 32, it is possible to supply, after connecting the heat exchangers 31 and 32 in parallel, the high-temperature medium provided for heating to the heat exchanger 31 (or 32), which is a portion of the heat exchangers of the interior heat exchanger 30, and use the remaining heat exchanger 32 (or 31) as a flow path into which the low-temperature medium caused to bypass the exterior heat exchanger 40 flows. Therefore, it is not necessary to add a bypass for the low-temperature medium to the heat medium circuit 20.

In a case where the first heat exchanger 31 and the second heat exchanger 32 are connected in parallel, pipes 808 and 809 that are not used at the time of series connection are used. The pipe 808 connects the downstream valve 63 and the first heat exchanger 31 to each other. The pipe 809 connects the intermediate valve 60 and the upstream valve 66 to each other. In the case of parallel connection, a pipe 810 that connects the intermediate valve 60 and the first heat exchanger 31 to each other is not used.

At the time of heating, it is not necessary to cause heat exchange between air sent to the vehicle cabin 2 by the blower 33 and the low-temperature medium. In consideration of a fact that the heat source is not always sufficient, it is preferable that a heat exchanger into which the low-temperature medium flows is simply a flow path that is not accompanied with heat exchange with air.

Therefore, in the exhaust-heat-as-main-heat-source heating mode M4, it is preferable that the low-temperature medium is supplied to the second heat exchanger 32 on the leeward side and the control device 7 operates the damper 35 such that air is restricted from flowing into the second heat exchanger 32 on the leeward side.

For example, the damper 35 may cover the entire air inflow portion of the second heat exchanger 32 as shown in FIG. 4 so that air inflow into the second heat exchanger 32 is cut off.

Here, although depending on the heating target temperature, the damper 35 may not completely cover the air inflow portion of the second heat exchanger 32 so that a portion of air passing through the first heat exchanger 31 flows into the second heat exchanger 32.

In addition, even if the temperature of air that has been increased by the high-temperature medium flowing through the first heat exchanger 31 is lowered due to heat exchange with the low-temperature medium in the second heat exchanger 32 since the heating target temperature is sufficiently low, it is not necessary to cause the damper 35 to restrict air from flowing into the second heat exchanger 32 in a case where air conditioning air of the heating target temperature can be obtained. For example, the damper 35 may be operated to restrict air from flowing into the second heat exchanger 32 as necessary based on a temperature detected by a temperature sensor disposed between the first heat exchanger 31 and the second heat exchanger 32 or a temperature sensor disposed in the vehicle cabin 2 and the heating target temperature.

In the dehumidification and heating modes M5 and M6 (FIGS. 5 and 6), heating is performed while reducing the humidity of the vehicle cabin 2 to prevent window glass of the vehicle from fogging up due to expired air or the like of an occupant.

In the dehumidification and heating modes M5 and M6, the first heat exchanger 31 and the second heat exchanger 32 of the HVAC unit 3 are connected in parallel, the low-temperature medium is supplied to the first heat exchanger 31 on the windward side, and the high-temperature medium is supplied to the second heat exchanger 32 on the leeward side. That is, the temperatures of the heat mediums are reversed with respect to the temperatures of the heat mediums respectively supplied to the first heat exchanger 31 and the second heat exchanger 32 in the exhaust-heat-as-main-heat-source heating mode M4.

Since heat absorption operation from the outside air to the low-temperature medium is also performed in the dehumidification and heating modes M5 and M6, the low-temperature medium is distributed and supplied to the exterior heat exchanger 40 and the second heat exchanger 32.

Since the low-temperature medium is supplied to the first heat exchanger 31 on the windward side and the high-temperature medium is supplied to the second heat exchanger 32 on the leeward side, it is possible to obtain air conditioning air by heating air with the high-temperature medium in the second heat exchanger 32 after reducing the amount of steam in the air by causing the low-temperature medium to absorb heat from the air in the first heat exchanger 31.

In the present embodiment, in a case where a dehumidification and heating mode is selected (Yes in step S01), the heating target temperature $T_O$ and the temperature $T_B$ of the onboard equipment 5 are compared with each other (step S04).

In a case where the temperature $T_B$ detected by the onboard equipment temperature sensor 93 is higher than the heating target temperature $T_O$ (Yes in step S04), the dehumidification and heating exhaust heat recovery mode M5 in which dehumidification and heating are performed while exhaust heat is being recovered to the high-temperature medium is selected. At this time, as with the high-temperature side exhaust heat recovery heating mode M2, the high-temperature medium is supplied to the heat exchange path 51 of the exhaust heat recovery circuit 50.

In a case where the temperature $T_B$ of the onboard equipment 5 is lower than the heating target temperature To (No in step S04), the dehumidification and heating mode M6 in which the exhaust heat is recovered to neither the high-temperature medium nor the low-temperature medium and dehumidification and heating are performed is selected. At this time, the high-temperature medium flows through the high-temperature side bypass 52 and the low-temperature medium flows through the low-temperature side bypass 53.

Effect of Present Embodiment

According to the vehicle air conditioning system 1 of the present embodiment described above and the vehicle air conditioning method in which the vehicle air conditioning system 1 is used, it is possible to appropriately set directions in which the high-temperature medium and the low-temperature medium flow in accordance with a change of a heat source or a heat load while using the refrigerant circuit 10 and the heat medium circuit 20 having the same structures. Therefore, the various operating modes M1 to M6 can be realized.

Since the vehicle air conditioning system 1 includes the exhaust heat recovery circuit 50, it is possible to improve the heating performance by using the exhaust heat recovered from the onboard equipment 5 as a heat source at the time of heating in addition to the outside air.

Here, in a case where the temperature $T_B$ of the onboard equipment 5 is higher than the heating target temperature To, the exhaust heat of the onboard equipment 5 can be recovered to the high-temperature medium (the high-temperature side exhaust heat recovery heating mode M2 and the dehumidification and heating exhaust heat recovery mode M5) and even in a case where the temperature $T_B$ of the onboard equipment 5 is lower than the heating target temperature $T_O$, the exhaust heat of the onboard equipment 5 can be recovered to the low-temperature medium (the low-temperature side exhaust heat recovery heating mode M3). Due to recovery of the exhaust heat to the low-temperature medium, the temperature of a low-pressure side refrigerant in the refrigerant circuit 10 is increased and thus the pressure of the low-pressure side refrigerant is increased. As a result, the density of a refrigerant absorbed by the compressor 11 is increased and the amount of refrigerant circulation in the refrigerant circuit 10 is increased. Therefore, it is possible to improve the heating performance while suppressing power consumption of the compressor 11.

In a case where the temperature of the low-temperature medium or the high-temperature medium is lower than the outside air temperature $T_1 1$, heat absorption operation from the outside air is performed (the modes M2, M3, M5, and M6) and in a case where the temperature $T_2$ of the low-temperature medium is higher than the outside air temperature $T_1$ due to an increase in amount of heat generated from the onboard equipment 5 or the like, the exhaust-heat-as-main-heat-source heating mode M4 in which the low-temperature medium is caused to bypass the exterior heat exchanger 40 is selected. Therefore, it is possible to perform, without control or the like in which the amount of wind caused by the blower 43 of the exterior heat exchanger 40 is suppressed, heating operation while reliably preventing heat from being released from the low-temperature medium to the outside air and using the exhaust heat recovered to the low-temperature medium as a main heat source.

Note that since traveling of the vehicle influences the amount of wind in the exterior heat exchanger 40, it is not possible to completely prevent the heat from being released from the low-temperature medium to the outside air even if the amount of air in the exterior heat exchanger 40 is limited.

According to the exhaust-heat-as-main-heat-source heating mode M4, it is possible to improve, under a condition in which the temperature $T_2$ of the low-temperature medium is higher than the outside air temperature $T_1$, the heating performance by sending an amount of the exhaust heat recovered from the onboard equipment 5 to the refrigerant circuit 10 without dumping the exhaust heat to the outside air.

According to the present embodiment, since the low-temperature medium is caused to bypass the exterior heat exchanger 40 in the exhaust-heat-as-main-heat-source heating mode M4, it is possible to realize efficient heating operation while sufficiently using the exhaust heat without heat being released to the outside air. Therefore, it is not necessary to control a low pressure in the refrigerant circuit 10 with an electronic expansion valve in accordance with the amount of exhaust heat recovery even in a case where the temperature $T_2$ of the heat medium at the outlet of the evaporator is higher than the outside air temperature $T_1$, and a thermostatic expansion valve is sufficient as the expansion valve 13. Therefore, it is possible to suppress the device cost.

In the present embodiment, a heat exchanger (32) which is a portion of the plurality of heat exchangers in the HVAC unit 3 is used as a bypass destination of the low-temperature medium in the exhaust-heat-as-main-heat-source heating mode M4. Here, a circuit structure, in which the first heat exchanger 31 and the second heat exchanger 32 are connected in parallel, the low-temperature medium is supplied to one of the first heat exchanger 31 and the second heat exchanger 32, and the high-temperature medium is supplied to the other of the first heat exchanger 31 and the second heat exchanger 32, is usually included in the vehicle air conditioning system 1 provided with a dehumidification and heating mode. Therefore, it is not necessary to newly add a pipe, a valve, or the like to the vehicle air conditioning system 1 for a purpose of causing the low-temperature medium to move to the second heat exchanger 32 via a bypass.

Furthermore, since it is possible to cut off supply of air to the second heat exchanger 32, to which the low-temperature medium is supplied, by means of the damper 35 that is provided in the HVAC unit 3 and that adjusts the blow-off temperature of air to the vehicle cabin 2, heat exchange between the low-temperature medium and air in the second heat exchanger 32 can be prevented. In this case, since there is no heat exchange between the low-temperature medium that has been caused to move to the second heat exchanger 32 via a bypass without passing through the exterior heat exchanger 40 and air, it is possible to improve the heating performance by sending, to the evaporator 14, the exhaust heat recovered from the onboard equipment 5 to the low-temperature medium while obtaining air having an appropriate temperature through heat exchange between the high-temperature medium and air in the first heat exchanger 31.

Modification Example

In addition to the above, it is possible to select the configurations described in the above-described embodiment or change the configurations to other configurations as appropriate.

Figure 8:
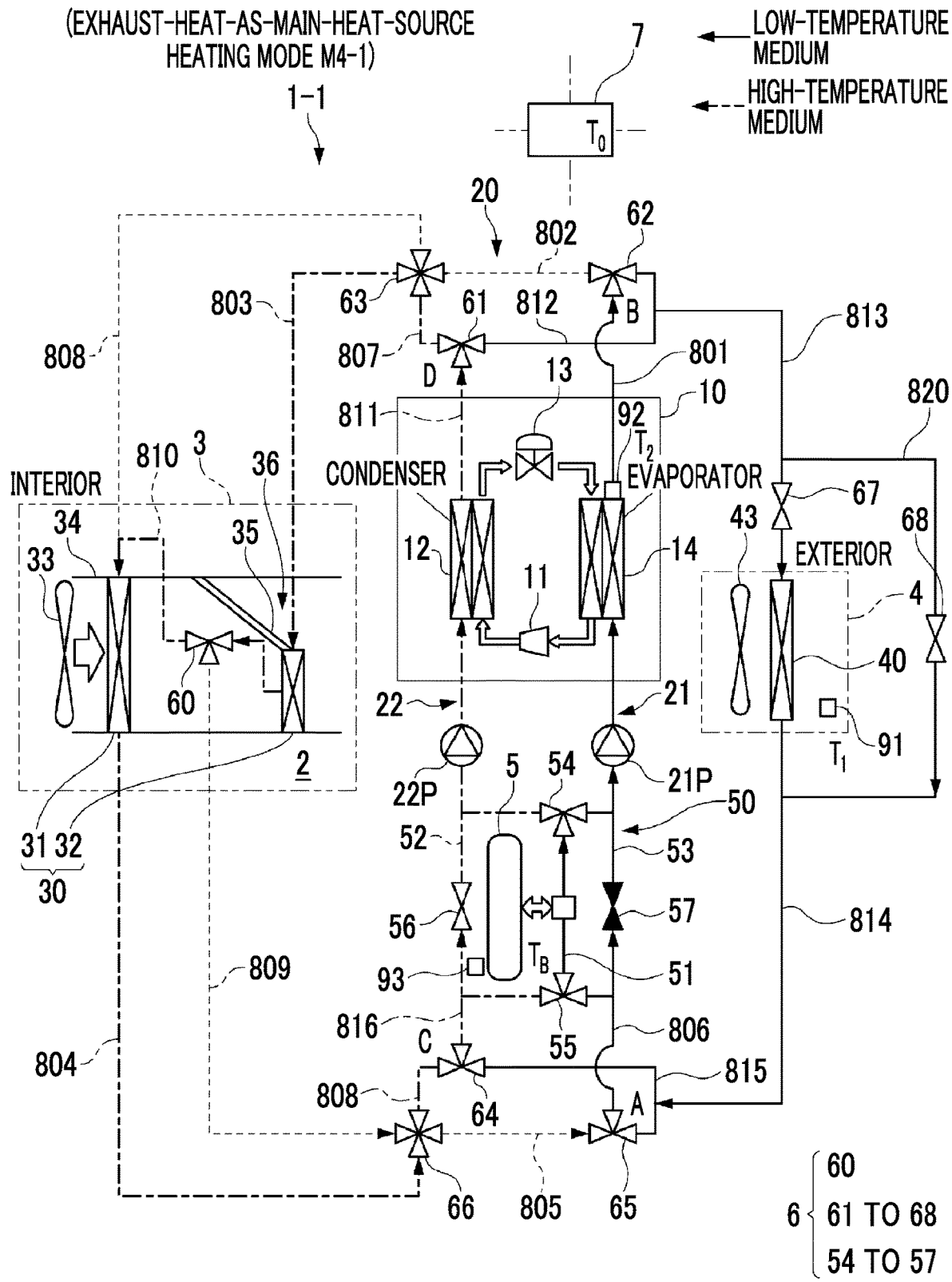
FIG. 8 is a diagram that schematically shows a vehicle air conditioning system according to a modification example of the present disclosure and that shows an example of respective paths for the low-temperature medium and the high-temperature medium in an exhaust-heat-as-main-heat-source heating mode.

A vehicle air conditioning system 1-1 shown in FIG. 8 is a system obtained by adding a bypass path 820 for causing the low-temperature medium to bypass the exterior heat exchanger 40 and valves 67 and 68 to the vehicle air conditioning system 1 in the above-described embodiment. The vehicle air conditioning system 1-1 is configured in the same manner as the vehicle air conditioning system 1 of the above-described embodiment and operates in the same manner in each of the operating modes M2, M3, M5, and M6.

FIG. 8 shows how the heat mediums flow in an exhaust-heat-as-main-heat-source heating mode M4-1 of the vehicle air conditioning system 1-1. It is possible to cause the low-temperature medium to bypass the exterior heat exchanger 40 via the bypass path 820 by causing the control device 7 to close the valve 67 and open the valve 68 in a case where the first condition and the second condition as described above are satisfied. Therefore, it is possible to prevent heat release from the low-temperature medium to the outside air.

In other operating modes, the valve 67 is opened and the valve 68 is closed and thus the heat medium flows through the exterior heat exchanger 40.

In the exhaust-heat-as-main-heat-source heating mode M4-1, the first heat exchanger 31 and the second heat exchanger 32 are connected in series as in the case of the low-temperature side exhaust heat recovery heating mode M3. Therefore, air sent by the blower 33 exchanges heat with the high-temperature medium flowing through the second heat exchanger 32 and the first heat exchanger 31 and is blown out to the vehicle cabin 2. It is possible to adjust a blow-off temperature by adjusting the opening degree of the damper 35.

If the heat medium circuit 20 is provided with the bypass path 820, it is possible to improve the heating performance by causing the low-temperature medium to bypass the exterior heat exchanger 40 even in a case where only one heat exchanger is provided as the interior heat exchanger 30.

As with the above-described embodiment and the modification example, it is preferable that the low-temperature medium is caused to completely bypass the exterior heat exchanger 40 in a case where the first condition and the second condition are satisfied. However, causing a portion of the low-temperature medium to bypass the exterior heat exchanger 40 while supplying the rest of the low-temperature medium to the exterior heat exchanger 40 is also allowed since it is possible to suppress heat release from the low-temperature medium to the outside air and to improve the heating performance in such a case as well. In this case, as with the dehumidification and heating modes M5 and M6, the low-temperature medium is distributed and supplied to the exterior heat exchanger 40 and the first heat exchanger 31.

Whether or not the first condition which is used for mode selection performed by the control device 7 is satisfied may not be determined by using the temperature $T_B$ of the onboard equipment 5 and the heating target temperature $T_O$ and may be determined by using an appropriate threshold value or the like related to a physical quantity such as the temperature, pressure, or the like of a refrigerant or a heat medium, for example.

Whether or not the second condition may also not be determined by using the outside air temperature $T_1$ and the temperature $T_2$ of the heat medium and may be determined by using an appropriate threshold value or the like related to a physical quantity such as the temperature of the onboard equipment 5 and the pressure or the like of a refrigerant or a heat medium, for example. As any index that can be referred to for prevention of heat release to the outside air, a physical quantity such as the temperature, pressure, or the like of a refrigerant can be used in addition to the outside air temperature $T_1$ and the temperature $T_2$ of the heat medium.

Appendix

The vehicle air conditioning system and the vehicle air conditioning method described above are understood as follows, for example.

[1] Each of the vehicle air conditioning systems 1 and 1-1 includes the refrigerant circuit 10 in whicha refrigerant circulates in accordance with a refrigerating cycle, the heat medium circuit 20 that includes the high-temperature medium circuit 22 in which a heat medium absorbing heat from the refrigerant of the refrigerant circuit 10 circulates and the low-temperature medium circuit 21 in which a heat medium releasing heat to the refrigerant of the refrigerant circuit circulates, the interior heat exchanger 30 that causes heat exchange between the heat medium and air, the exterior heat exchanger 40 that causes heat exchange between the heat medium and outside air, the exhaust heat recovery circuit 50 that is configured such that heat is transferrable and receivable between the onboard equipment 5 and the heat medium, and the switch unit 6 that is configured to switch a direction in which the heat medium flows.

The air conditioning systems 1 and 1-1 are provided with the exhaust heat recovery heating mode M3 in which the heat medium of the high-temperature medium circuit is supplied to the interior heat exchanger 30, exhaust heat from the onboard equipment 5 is recovered to the heat medium of the low-temperature medium circuit 21, and the heat medium that has recovered the exhaust heat and that has released heat to the refrigerant is supplied to the exterior heat exchanger 40 and the exhaust-heat-as-main-heat-source heating mode M4 in which the heat medium of the high-temperature medium circuit is supplied to the interior heat exchanger 30, the exhaust heat from the onboard equipment 5 is recovered to the heat medium of the low-temperature medium circuit, and the heat medium that has recovered the exhaust heat and that has released heat to the refrigerant is caused to bypass the exterior heat exchanger 40 are provided as air conditioning system operating modes.

[2] The air conditioning system 1 includes the outside air temperature sensor 91 that detects the temperature of the outside air, the heat medium temperature sensor 92 that detects the temperature of the heat medium at an outlet of the evaporator 14 in which heat is released from the heat medium to the refrigerant, at an inlet of the exterior heat exchanger 40, or between the outlet and the inlet, and the control device 7 that controls the operation of the switch unit 6 in accordance with the operating mode. The control device 7 selects the exhaust-heat-as-main-heat-source heating modes M4 and M4-1 by using the outside air temperature $T_1$ detected by the outside air temperature sensor 91 and the temperature $T_2$ detected by the heat medium temperature sensor 92.

[3] The interior heat exchanger 30 includes the first heat exchanger 31 and the second heat exchanger 32 that are disposed in series in a direction in which air is caused to flow by the blower (33). In the exhaust-heat-as-main-heat-source heating mode M4, the heat medium of the high-temperature medium circuit 22 is supplied to the first heat exchanger 31 on a windward side and the heat medium that has recovered the exhaust heat and has released heat to the refrigerant is supplied to the second heat exchanger 32 on a leeward side.

[4] The air conditioning system 1 includes the damper 35 that is configured to change the amount of inflow of air that passes through the first heat exchanger 31 and that flows into the second heat exchanger 32. In the exhaust-heat-as-main-heat-source heating mode M4, the damper 35 is operated to restrict the air from flowing into the second heat exchanger 32.

[5] The air conditioning systems 1 and 1-1 are provided with the dehumidification and heating modes M5 and M6 in which the heat medium of the low-temperature medium circuit 21 is supplied to the first heat exchanger 31 and the heat medium of the high-temperature medium circuit 22 is supplied to the second heat exchanger 32 as the operating mode.

[6] The exhaust heat recovery circuit 50 includes the heat exchange path 51 in which the heat medium of one of the high-temperature medium circuit 22 and the low-temperature medium circuit 21 is thermally coupled to the onboard equipment 5, the bypass of high-temperature side 52 through which the heat medium of the high-temperature medium circuit 22 bypasses the onboard equipment 5, and the bypass of low-temperature side 53 through which the heat medium of the low-temperature medium circuit 21 bypasses the onboard equipment 5. The heat mediums are distributable to the heat exchange path 51 and the bypass 52 (or to 51 and 53) by operating the switch unit 6.

[7] The air conditioning systems 1 and 1-1 are provided with the high-temperature side exhaust heat recovery heating mode M2 in which the exhaust heat from the onboard equipment 5 is recovered to the heat medium of the high-temperature medium circuit 22, the heat medium that has recovered the exhaust heat and that has absorbed heat from the refrigerant is supplied to the interior heat exchanger 30, and the heat medium of the low-temperature medium circuit 21 is supplied to the exterior heat exchanger 40 as the operating mode.

[8] Provided is an air conditioning method in which a vehicle air conditioning system is used and each of the air conditioning systems 1 and 1-1 includes the refrigerant circuit 10 in which a refrigerant circulates in accordance with a refrigerating cycle, the heat medium circuit 20 that includes the high-temperature medium circuit 22 in which a heat medium absorbing heat from the refrigerant of the refrigerant circuit 10 circulates and the low-temperature medium circuit 21 in which a heat medium releasing heat to the refrigerant of the refrigerant circuit 10 circulates, the interior heat exchanger 30 that causes heat exchange between the heat medium and air, the exterior heat exchanger 40 that causes heat exchange between the heat medium and outside air, the exhaust heat recovery circuit 50 that is configured such that heat is transferrable and receivable between the onboard equipment 5 and the heat medium, and the switch unit 6 that is configured to switch a direction in which the heat medium flows.

In the air conditioning method, the heat medium of the low-temperature medium circuit 21 is caused to recover the exhaust heat from the onboard equipment 5 in a case where a first condition in which the temperature of the onboard equipment 5 is lower than the heating target temperature To set in the air conditioning systems 1 and 1-1. In a case where a second condition in which the temperature of the heat medium of the low-temperature medium circuit 21 that has released heat to the refrigerant after recovering the exhaust heat from the onboard equipment 5 is higher than the temperature of the outside air is satisfied in addition to the first condition, the heat medium of the low-temperature medium circuit 21 is caused to recover the exhaust heat from the onboard equipment 5 and the heat medium that has recovered the exhaust heat is caused to bypass the exterior heat exchanger 40.

REFERENCE SIGNS LIST 1, 1-1: vehicle air conditioning system
2: vehicle cabin
3: HVAC unit
4: exterior heat exchanger unit
5: onboard equipment
6: switch unit
7: control device
10: refrigerant circuit
11: compressor
12: condenser
13: expansion valve
14: evaporator
20: heat medium circuit
21: low-temperature medium circuit
21P: pump
22: high-temperature medium circuit
22P: pump
30: interior heat exchanger
31: first heat exchanger
32: second heat exchanger
33: blower (blower)
34: duct
35: damper
36: flow path
40: exterior heat exchanger
43: blower
50: exhaust heat recovery circuit
51: heat exchange path
52: high-temperature side bypass
53: low-temperature side bypass
54 to 57: valve
60: intermediate valve
61 to 63: downstream valve
64 to 66: upstream valve
67, 68: valve
91: outside air temperature sensor
92: heat medium temperature sensor
93: onboard equipment temperature sensor
801 to 816: pipe
820: bypass path
M1: cooling mode
M2: high-temperature side exhaust heat recovery heating mode
M3: low-temperature side exhaust heat recovery heating mode
M4: exhaust-heat-as-main-heat-source heating mode
M5: dehumidification and heating exhaust heat recovery mode
M6: dehumidification and heating mode
S01, S02, S03, S04: step
$T_0$: heating target temperature
$T_1$: outside air temperature
$T_2$: temperature of heat medium
$T_B$: temperature of onboard equipment

The invention claimed is:
1. A vehicle air conditioning system comprising:
a refrigerant circuit in which a refrigerant circulates in accordance with a refrigerating cycle;
a heat medium circuit that includes a high-temperature medium circuit in which a heat medium absorbing heat from the refrigerant of the refrigerant circuit circulates and a low-temperature medium circuit in which a heat medium releasing heat to the refrigerant of the refrigerant circuit circulates;

an interior heat exchanger that causes heat exchange between the heat medium and air;

an exterior heat exchanger that causes heat exchange between the heat medium and outside air;

an exhaust heat recovery circuit that is configured such that heat is transferrable and receivable between onboard equipment and the heat medium; and a switch unit that is configured to switch a direction in which the heat medium flows, wherein the switch unit is configured such that, in an exhaust heat recovery heating mode, in which the heat medium of the high-temperature medium circuit is supplied to the interior heat exchanger, exhaust heat from the onboard equipment is recovered to the heat medium of the low-temperature medium circuit, and the heat medium that has recovered the exhaust heat and that has released heat to the refrigerant is supplied to the exterior heat exchanger in a case where a first condition in which a temperature of the onboard equipment is lower than a heating target temperature set in the air conditioning system, and wherein the switch unit is configured such that, in an exhaust-heat-as-main-heat-source heating mode, in which the heat medium of the high-temperature medium circuit is supplied to the interior heat exchanger, the exhaust heat from the onboard equipment is recovered to the heat medium of the low-temperature medium circuit, and the heat medium that has recovered the exhaust heat and that has released heat to the refrigerant is caused to bypass the exterior heat exchanger in a case where a second condition in which a temperature of the heat medium of the low-temperature medium circuit that has released heat to the refrigerant after recovering the exhaust heat from the onboard equipment is higher than a temperature of the outside air is satisfied in addition to the first condition, and wherein the exhaust heat recovery heating mode and the exhaust-heat-as main-heat source heating mode are provided as operating modes of the air conditioning system, and wherein the exhaust heat recovery circuit includes,
a heat exchange path in which the heat medium of one of the high-temperature medium circuit and the low-temperature medium circuit is thermally coupled to the onboard equipment,
a bypass of high-temperature side through which the heat medium of the high-temperature medium circuit bypasses the onboard equipment, and
a bypass of low-temperature side through which the heat medium of the low-temperature medium circuit bypasses the onboard equipment, and
the heat mediums are distributable to the heat exchange path and the bypasses by operating the switch unit.

2. The vehicle air conditioning system according to claim 1, further comprising:

an outside air temperature sensor that detects a temperature of the outside air, a heat medium temperature sensor that detects a temperature of the heat medium at an outlet of an evaporator in which heat is released from the heat medium to the refrigerant, at an inlet of the exterior heat exchanger, or between the outlet and the inlet; and a controller that controls operation of the switch unit in accordance with an operating mode, wherein the controller selects the exhaust-heat-as-main-heat-source heating mode by using an outside air temperature detected by the outside air temperature sensor and a temperature detected by the heat medium temperature sensor.

3. The vehicle air conditioning system according to claim 2, wherein the interior heat exchanger includes a first heat exchanger and a second heat exchanger that are disposed in series in a direction in which the air is caused to flow by a blower, and in the exhaust-heat-as-main-heat-source heating mode, the heat medium of the high-temperature medium circuit is supplied to the first heat exchanger on a windward side and the heat medium that has recovered the exhaust heat and has released heat to the refrigerant is supplied to the second heat exchanger on a leeward side.

4. The vehicle air conditioning system according to claim 2, wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as the operating mode.

5. The vehicle air conditioning system according to claim 1, wherein the interior heat exchanger includes a first heat exchanger and a second heat exchanger that are disposed in series in a direction in which the air is caused to flow by a blower, and in the exhaust-heat-as-main-heat-source heating mode, the heat medium of the high-temperature medium circuit is supplied to the first heat exchanger on a windward side and the heat medium that has recovered the exhaust heat and has released heat to the refrigerant is supplied to the second heat exchanger on a leeward side.

6. The vehicle air conditioning system according to claim 5, further comprising:

a damper that is configured to change an amount of inflow of the air that passes through the first heat exchanger and that flows into the second heat exchanger, wherein, in the exhaust-heat-as-main-heat-source heating mode, the damper is operated to restrict the air from flowing into the second heat exchanger.

7. The vehicle air conditioning system according to claim 6, wherein a dehumidification and heating mode in which the heat medium of the low-temperature medium circuit is supplied to the first heat exchanger and the heat medium of the high-temperature medium circuit is supplied to the second heat exchanger is provided as an operating mode.

8. The vehicle air conditioning system according to claim 6, wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as an the operating mode.

9. The vehicle air conditioning system according to claim 5,
wherein a dehumidification and heating mode in which the heat medium of the low-temperature medium circuit is supplied to the first heat exchanger and the heat medium of the high-temperature medium circuit is supplied to the second heat exchanger is provided as an operating mode.

10. The vehicle air conditioning system according to claim 9,
wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as the operating mode.

11. The vehicle air conditioning system according to claim 5,
wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as an operating mode.

12. The vehicle air conditioning system according to claim 1,
wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as an operating mode.

13. A vehicle air conditioning method in which a vehicle air conditioning system is used, the air conditioning system including a refrigerant circuit in which a refrigerant circulates in accordance with a refrigerating cycle, a heat medium circuit that includes a high-temperature medium circuit in which a heat medium absorbing heat from the refrigerant of the refrigerant circuit circulates and a low-temperature medium circuit in which a heat medium releasing heat to the refrigerant of the refrigerant circuit circulates, an interior heat exchanger that causes heat exchange between the heat medium and air, an exterior heat exchanger that causes heat exchange between the heat medium and outside air, an exhaust heat recovery circuit that is configured such that heat is transferrable and receivable between onboard equipment and the heat medium, and a switch unit that is configured to switch a direction in which the heat medium flows, the air conditioning method comprising:
causing the heat medium of the low-temperature medium circuit to recover exhaust heat from the onboard equipment in a case where a first condition in which a temperature of the onboard equipment is lower than a heating target temperature set in the air conditioning system, and
causing the heat medium of the low-temperature medium circuit to recover the exhaust heat from the onboard equipment and causing the heat medium that has recovered the exhaust heat to bypass the exterior heat exchanger in a case where a second condition in which a temperature of the heat medium of the low-temperature medium circuit that has released heat to the refrigerant after recovering the exhaust heat from the onboard equipment is higher than a temperature of the outside air is satisfied in addition to the first condition.

14. A vehicle air conditioning system comprising:
a refrigerant circuit in which a refrigerant circulates in accordance with a refrigerating cycle;
a heat medium circuit that includes a high-temperature medium circuit in which a heat medium absorbing heat from the refrigerant of the refrigerant circuit circulates and a low-temperature medium circuit in which a heat medium releasing heat to the refrigerant of the refrigerant circuit circulates;
an interior heat exchanger that causes heat exchange between the heat medium and air;
an exterior heat exchanger that causes heat exchange between the heat medium and outside air,
an exhaust heat recovery circuit that is configured such that heat is transferrable and receivable between onboard equipment and the heat medium; and
a switch unit that is configured to switch a direction in which the heat medium flows,
wherein the switch unit is configured such that, in an exhaust heat recovery heating mode, in which the heat medium of the high-temperature medium circuit is supplied to the interior heat exchanger, exhaust heat from the onboard equipment is recovered to the heat medium of the low-temperature medium circuit, and the heat medium that has recovered the exhaust heat and that has released heat to the refrigerant is supplied to the exterior heat exchanger in a case where a first condition in which a temperature of the onboard equipment is lower than a heating target temperature set in the air conditioning system, and
wherein the switch unit is configured such that, in an exhaust-heat-as-main-heat-source heating mode, in which the heat medium of the high-temperature medium circuit is supplied to the interior heat exchanger, the exhaust heat from the onboard equipment is recovered to the heat medium of the low-temperature medium circuit, and the heat medium that has recovered the exhaust heat and that has released heat to the refrigerant is caused to bypass the exterior heat exchanger in a case where a second condition in which a temperature of the heat medium of the low-temperature medium circuit that has released heat to the refrigerant after recovering the exhaust heat from the onboard equipment is higher than a temperature of the outside air is satisfied in addition to the first condition, and
wherein the exhaust heat recovery heating mode and the exhaust-heat-as main-heat source heating mode are provided as operating modes of the air conditioning system, and
wherein a high-temperature side exhaust heat recovery heating mode in which the exhaust heat from the onboard equipment is recovered to the heat medium of the high-temperature medium circuit, the heat medium that has recovered the exhaust heat and that has absorbed heat from the refrigerant is supplied to the interior heat exchanger, and the heat medium of the low-temperature medium circuit is supplied to the exterior heat exchanger is provided as an operating mode.

\* \* \* \* \*